May 4, 1954

K. McCANN

BELT CONVEYER 2,677,456

Filed July 1, 1952

Inventor:
Keith McCann

By Murray G. Gleeson
Attorney.

May 4, 1954  K. McCANN  2,677,456
BELT CONVEYER

Filed July 1, 1952 2 Sheets-Sheet 2

Inventor:
Keith McCann
By Murray A. Gleeson
Attorney.

Patented May 4, 1954

2,677,456

UNITED STATES PATENT OFFICE 2,677,456

BELT CONVEYER

Keith McCann, Taylorville, Ill., assignor to Goodman Manufacturing Company, Chicago, Ill., a corporation of Illinois Application July 1, 1952, Serial No. 296,689

8 Claims. (Cl. 198—184)

1

This invention relates to momentum absorbing means for the upper run of a conveyor belt at a material loading station.

The structure according to the present invention is adapted for use with heavy duty conveyor belts including vertically spaced upper and lower runs.

Such conveyor belts in accordance with present practice have the load bearing upper run thereof supported by rollers at relatively closely spaced intervals and in conveyors adapted to transport loose material such as coal or ore. The supporting rollers comprise a series of horizontally disposed rollers for supporting the central portion of the upper run of the belt and series of rollers at opposite ends of the horizontal rollers and having their axes laterally and upwardly inclined in order to provide a trough in the upper run of the conveyor belt for retaining the material being conveyed thereon.

Such heavy duty conveyor belt structures are capable of withstanding relatively heavy loads and have been found satisfactory in the transportation of heavy material from one position to another position when the belt is subjected only to the weight of the material in a quiescent state relative to the belt.

However, conveyor belts for the use referred to are necessarily movable past a material loading station which usually comprises an endless belt disposed above and in angular relation to the conveyor belt whereby the material falls by gravity from the endless belt onto the upper run of the conveyor belt intermediate the ends thereof.

While, as before stated, the upper run of the conveyor belt is supported by relatively closely disposed rollers sufficient to bear the weight of the material being conveyed, without any resulting damage to the belt, the belt is, however, subjected to damaging effects by the momentum of the relatively heavy material upon falling from the endless belt onto the conveyor belt.

This action on the conveyor belt has both a battering and stretching effect which causes a weakening thereof and in time the belt is rendered unserviceable even for the horizontal transportation of the material.

It is a primary object of the present invention to provide a momentum absorbing structure for operative association with a conveyor belt at a material loading station whereby the above noted objections are substantially, if not, wholly overcome.

A further object of the invention is to provide an endless buffer belt for operative association with a material conveyor belt at a loading station and wherein the buffer belt includes upper and lower runs under spring tension and with the upper run in frictional and driving contact with the lower face of the upper run of the conveyor belt.

Other objects and advantages of the invention will become apparent in the course of the following detailed description, taken in connection with the accompanying drawings, wherein.

Figures 1, 2:
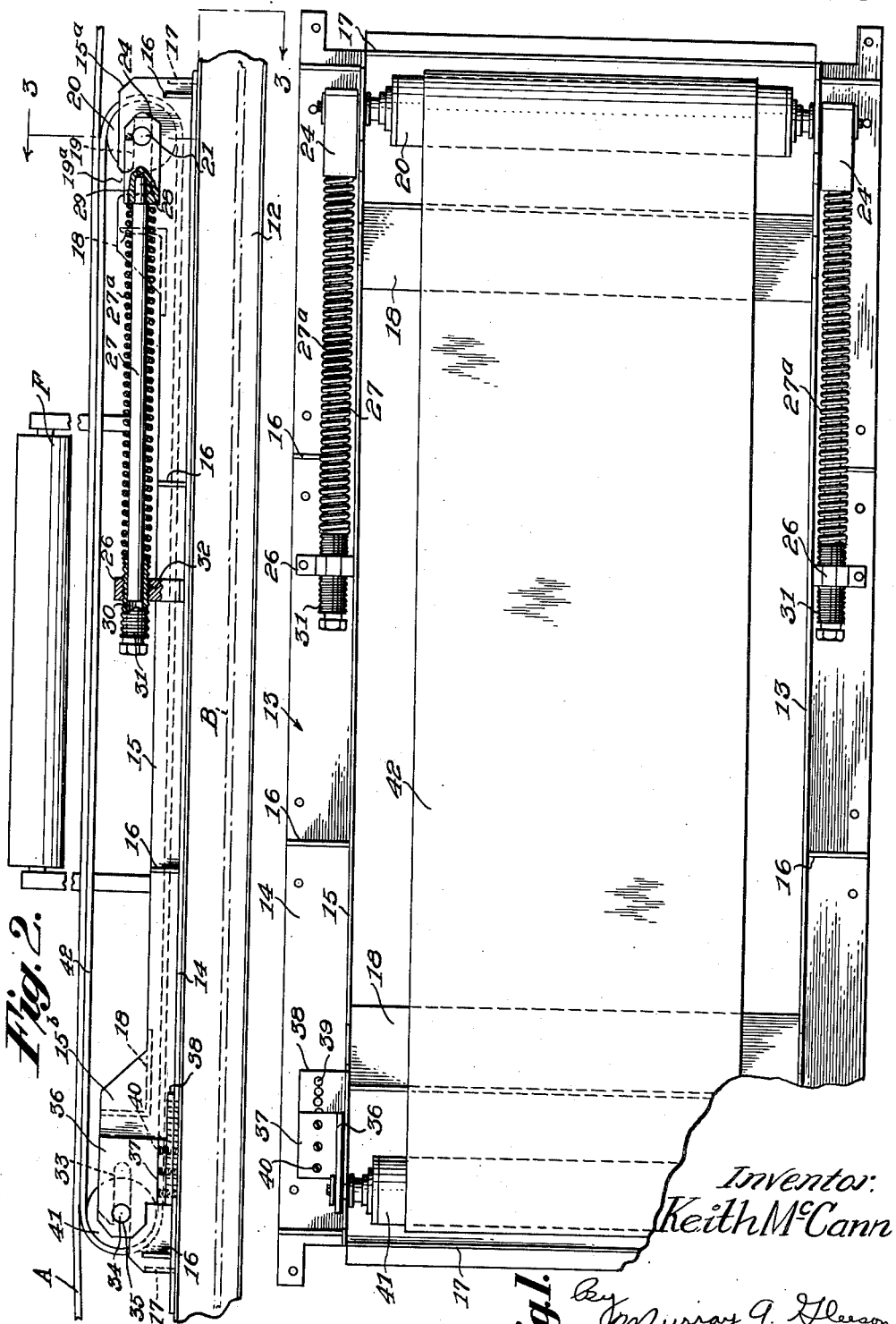
Figure 1 is a top plan view of the impact absorbing support for the upper run of a conveyor belt with the supporting sub-frame omitted for clarity in illustration.
Fig. 2 is a side elevational view of the structure of Fig. 1 partially broken away and in section and showing in addition the sub-frame and the upper and lower runs of the conveyor belt.
Figure 3:
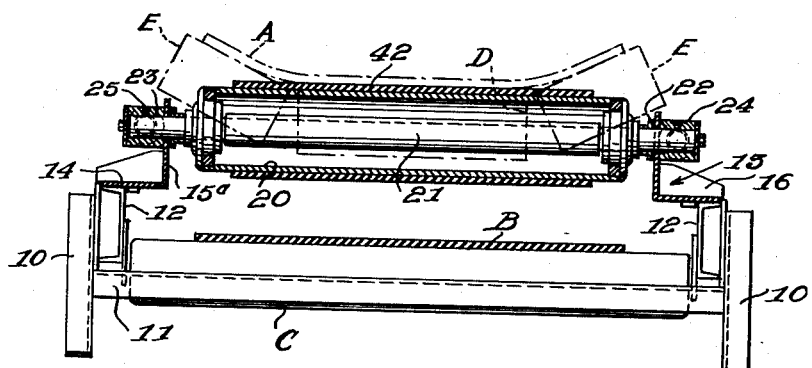
Fig. 3 is a transverse sectional view in the plane of line 3—3 on Fig. 2.

Referring now in detail to the drawings wherein is illustrated the improved construction in accordance with a preferred structural embodiment thereof, the frame, while not necessarily being of any particular construction is shown as comprising four vertically disposed corner supporting legs 10 preferably of channel form.

A pair of inverted U-channel members 11 provide the ends of the frame and each thereof has its opposed end rigidly connected to a pair of supporting legs 10 at each end of the frame.

A pair of outwardly facing channel bars 12 provide the opposite sides of the frame and such bars are disposed at right angles to the members 11 and have their opposite ends supported thereon and connected thereto. The supporting frame further includes an angle bar 13 extending longitudinally of each channel bar 12 and including a horizontal flange 14 seated upon and secured to the upper face of bar 12.

The angle bars 13 each further include a vertical flange 15 and transversely disposed and longitudinally spaced brace plates 16 interconnect the said flanges.

The longitudinally extending angle bars 13 are rigidly connected at their corresponding opposite ends by transversely extending angle bars 17 which with the longitudinal angle bars 13 provide a rectangular open frame. The vertical flanges 15 of the angle bars 13 are of increased height adjacent their opposite ends as indicated at 15a and 15b in Fig. 2 and the angle bars 13 adjacent the inner ends of said portions 15a and 15b are interconnected by transversely extending angle bars 18.

The flange portions 15a which are disposed in lateral alignment at opposite sides and at one end of the frame are provided with longitudinally extending slots 19 which open vertically through the upper edges of such flange portions as indicated at 19a.

A cylindrical roller 20 is rotatably supported on a transversely extending shaft 21 whose opposite ends extend freely through the transversely aligned slots 19 and suitable spacers 22 are supported on the shaft and disposed between the opposite ends of the roller and the flange portions 15a.

Each end of shaft 21 outwardly of the flange portion 15a extends through a transverse bore 23 in and adjacent one end of a spring seating member 24. The members 24 extend longitudinally in parallel relation to the angle bars 13 and are secured to the ends of the shaft 21 by means of screws 25.

A block 26 is supported on each angle bar 13 in longitudinally spaced relation to a corresponding spring seating member 24 and is rigidly secured to the horizontal and vertical flanges 14 and 15 respectively.

A cylindrical rod 27 is provided with a reduced end 28 which is received in a bore 29 in each spring seating member 24 and the rods at their opposite ends are loosely received within axial bores 30 in spring adjusting screws 31 which are adjustably threaded through tapped apertures 32 in the blocks 26.

An elongated relatively heavy coil spring 27a encircles each rod 27 and its opposite ends engage the adjacent end of the corresponding seating member 24 and the adjacent end of screw 31.

The flange portions 15b are provided with longitudinally extending slots 33 which open out through the ends of the flanges. The end portions of a second transversely extending shaft 34 extend through the slots 33 and into bores 35 in vertical flanges 36 of adjusting plates including said vertical flanges and horizontal flanges 37 disposed above and parallel to flanges 14 and the shaft ends are suitably secured in the vertical flanges 36.

An elongated plate 38 is supported upon and rigidly secured to the horizontal flange 14 of each angle bar 13 and is disposed between the flanges 14 and 37.

The plates 38 are each provided with a series of vertically disposed and longitudinally spaced tapped apertures 39 which also extend through flange 14 and the flanges 37 of the adjusting plates are provided with horizontally spaced screw receiving apertures 40 for alignment with selected tapped apertures 39 for receiving screws to hold the adjusting plates in any adjusted position relative to the angle bars 13. A second cylindrical roller 41 is rotatably supported on the shaft 34 and an endless belt 42 is trained over the rollers 20 and 41.

The structure above described is adapted for use with a material conveyor belt including an upper active run A and a lower inactive run B. The conveyor in accordance with standard practice comprises longitudinally spaced series of rollers for supporting the upper run A of the conveyor belt and longitudinally spaced rollers C for supporting the lower run of the belt.

The last named rollers C are usually horizontally disposed while each series of rollers for supporting the upper run of the belt includes a central horizontal roller D and a roller E disposed laterally of each end of roller D whereby the rollers of the several series thereof provide an upwardly open trough form to the upper run A of the conveyor belt for receiving and retaining loose material such as coal or ore which is delivered thereonto by an endless belt or the like F at a conveyor loading station which may be considered to be at the location of the momentum absorbing means above described.

Figure 4:
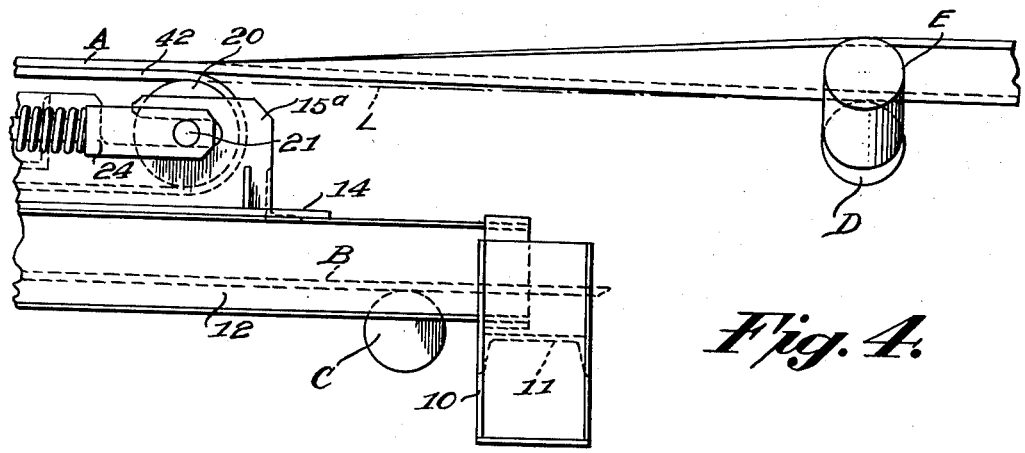
Fig. 4 is a substantially enlarged fragmental side elevational view of the right hand end of the impact absorbing support and showing in addition a portion of the upper run of the conveyor belt and one set of troughing supporting rollers for supporting the upper run of the conveyor belt.

In the use of the improved momentum absorbing means, the series of supporting rollers D—E for the upper run A of the conveyor belt are omitted for a distance from the rollers D—E indicated in Fig. 4 to a point substantially equally spaced from the opposite end of belt 42 and the adjacent series of rollers D—E are disposed approximately 3½ feet from the axes of the roller supporting shafts 21 and 34.

The belt 42 is driven through frictional engagement between the upper run thereof and the upper run A of the conveyor belt and in order to assure sufficient friction between the belt runs for such purpose, the uppermost points of rollers D and the uppermost points of rollers 20 and 41 are in a single horizontal plane whereby the upper conveyor belt run A is vertically displaced a distance equal to the thickness of the belt 42 as is indicated in Fig. 4 wherein the dot and dash line L indicates the referred to plane.

From the above, it will be seen that the momentum absorbing structure is disposed between the upper and lower runs A and B of the conveyor belt in a longitudinal zone thereof which is immediately below the material delivering endless belt F at a loading station along the length of the conveyor.

The material discharged from belt F onto the upper run A of the conveyor belt will have substantial momentum upon contacting the upper face of said upper run and which in the absence of any countering means would unduly flex the upper run even if supported by the series of rollers D—E throughout its extent and such deflection at repeated intervals would seriously impair the belt and render it unserviceable in use in a relatively short period of time.

With the momentum absorbing structure disclosed, however, the deflection of the upper conveyor belt run A is yieldably resisted by the belt 42, since upon downward movement of the said upper run A, which bears on the upper run of belt 42, the rollers 20, 41 would be urged toward each other, that is, the floating roller 20 would be urged toward the adjustably fixed roller 41. Such relative movement of the rollers, however, is yieldably resisted by the relatively heavy springs 27a which normally urge the rollers apart.

Furthermore, the structure is capable of ready adjustment for varying the yieldable resistance to deflection of the upper run A of the conveyor belt which is effected by turning the adjusting screws 31 in one direction or the other.

The belt 42 will, of course, wear out in time and since it may not always be possible to secure a replacement belt of the same length as the discarded belt, the replacement belt is fully capable of use if same approximates the length of the discarded belt since the roller 41 is capable of longitudinal adjustment by the means described.

Such adjustment feature may also be of use in taking up on the belt 42 when same has become unduly slack through stretching thereof in continued use without full reliance on the springs 27a which with an unduly long belt would urge the shaft 21 to or close to the inner closed ends of slots 19 which would effect the action of the springs in absorbing the momentum of material being discharged onto the conveyor belt at the loading station.

While I have disclosed my invention in accordance with a single structural embodiment thereof, such as to be considered as illustrative only, and not restrictive, the scope of the invention being defined in the sub-joined claims.

I claim:

1. In combination with a conveyor belt having vertically spaced upper and lower runs and means for admitting relatively heavy material under action of gravity onto said upper run at a loading station; means disposed between said runs at said station for absorbing the momentum of said material as discharged onto said upper run comprising an endless belt including an upper run having continuous surface frictional engagement with the lower face of said conveyor upper run and supporting means for said endless belt including a roller spring biased into supporting engagement with one end thereof for yieldably resisting vertical deflection of the upper run thereof.

2. Means operatively disposed between the upper and lower runs of a material conveyor belt for absorbing the momentum of material discharged onto said upper run under the action of gravity, comprising an elongated frame including a pair of laterally spaced parallel vertical flanges, a roller disposed between and rotatably supported by said flanges adjacent one end thereof and having a normally fixed axis, a second roller rotatably supported on a shaft whose opposite ends extend freely through longitudinal slots in said flanges adjacent the opposite end thereof, the ends of said shaft being fixed in spring seat members adjacent said flanges and outwardly thereof, a belt operatively engaged with said rollers and having the upper run thereof in frictional driving contact with the said upper run of the conveyor belt and spring means bearing on said spring seat members in opposition to said first roller for placing the upper run of the second named belt under tension for resisting undue deflection of the engaged upper run of the conveyor belt upon gravity discharge of material thereonto.

3. The structure according to claim 2, wherein said spring means comprises a block rigidly supported by each flange in substantial spaced relation to said shaft, a tubular nut adjustably threaded into each block, a pair of rods having corresponding ends thereof engaged with said spring seat members, the opposite ends of said rods being loosely disposed within the bores of said tubular nuts and an elongated coil spring surrounding each rod and having the opposite ends thereof engaged with a respective spring seat member and a block.

4. The structure according to claim 2 wherein said longitudinal slots open through the upper free edges of the flanges at points spaced from the bottoms of the slots for facilitating removal and replacement of the shaft.

5. The structure according to claim 2, wherein said first roller is supported on a shaft, longitudinal slots in said flanges opening through the said one end thereof and through which opposite ends of said shaft freely extend, angular members disposed exteriorly of and adjacent said flanges, said angular members including vertical flanges having bores into which the free ends of said shaft extend and said angular members further including horizontal flanges, and adjustable connections between said horizontal flanges and said frame for selectively varying the distance between said rollers independently of said spring means.

6. The structure according to claim 2, wherein said upper run of the conveyor belt is supported on troughing rollers beyond the opposite ends of said momentum absorbing means and which include horizontal rollers whose uppermost points are horizontally aligned with uppermost points of the rollers in the momentum absorbing means, whereby the upper run of the conveyor belt is vertically displaced a distance equal to the thickness of the belt in the momentum absorbing means for providing sufficient frictional contact between the two belts for driving of the momentum absorbing belt by the conveyor belt.

7. In a belt conveyor having a main endless belt trained in upper and lower runs, the upper run supported at intervals by troughing rollers including upwardly and outwardly inclined side rollers and horizontal central rollers; a loading station comprising, a length of the upper run unsupported by said troughing rollers at said station; a frame rotatably supporting a pair of transversely extending, longitudinally spaced auxiliary rollers between said runs disposed at substantially the level of said horizontal troughing rollers; a relatively short buffer belt stretched over said auxiliary rollers; the upper runs of the two belts being in frictional engagement to drive the buffer belt from the main belt; said auxiliary rollers being relatively longitudinally movable on said frame to vary the spacing therebetween; and resilient means acting between said auxiliary rollers to urge them apart along the longitudinal axis of the main belt to maintain said buffer belt tensioned for absorbing shock of material being loaded onto the main belt.

8. The structure according to claim 7, wherein the top surfaces of the auxiliary rollers and of the horizontal troughing rollers are substantially in a horizontal plane.

References Cited in the file of this patent

UNITED STATES PATENTS

| Number | Name | Date |
|---|---|---|
| 2,323,368 | Biedess | July 6, 1943 |

FOREIGN PATENTS

| Number | Country | Date |
|---|---|---|
| 444,099 | Germany | May 11, 1927 |